United States Patent
Madar, III et al.

(10) Patent No.: US 11,176,493 B2
(45) Date of Patent: Nov. 16, 2021

(54) VIRTUALIZING EXTERNAL MEMORY AS LOCAL TO A MACHINE LEARNING ACCELERATOR

(71) Applicant: Google LLC, Mountain View, CA (US)

(72) Inventors: Lawrence J. Madar, III, San Francisco, CA (US); Temitayo Fadelu, San Francisco, CA (US); Harshit Khaitan, San Jose, CA (US); Ravi Narayanaswami, San Jose, CA (US)

(73) Assignee: Google LLC, Mountain View, CA (US)

( * ) Notice: Subject to any disclaimer, the term of this patent is extended or adjusted under 35 U.S.C. 154(b) by 316 days.

(21) Appl. No.: 16/397,481

(22) Filed: Apr. 29, 2019

(65) Prior Publication Data
US 2020/0342350 A1 Oct. 29, 2020

(51) Int. Cl.
*G06N 20/00* (2019.01)
(52) U.S. Cl.
CPC .................. *G06N 20/00* (2019.01)
(58) Field of Classification Search
CPC ...... G06N 20/00; G06N 3/0454; G06N 3/063; Y02D 10/00; G06F 12/1036
USPC .......................................................... 706/12
See application file for complete search history.

(56) References Cited

U.S. PATENT DOCUMENTS

| | | | |
|---|---|---|---|
| 9,710,265 B1 | 7/2017 | Temam | |
| 10,746,792 B1* | 8/2020 | Diamant | G01R 31/31727 |
| 2014/0047251 A1 | 2/2014 | Kottilingal et al. | |
| 2014/0176572 A1 | 6/2014 | Vembu et al. | |
| 2017/0206464 A1 | 7/2017 | Clayton et al. | |
| 2019/0243756 A1* | 8/2019 | Ray | G06F 12/0873 |
| 2020/0183482 A1* | 6/2020 | Sebot | G06N 20/00 |
| 2020/0211151 A1* | 7/2020 | Vaidyanathan | G06T 15/06 |
| 2021/0019631 A1* | 1/2021 | Das | G06N 3/084 |

FOREIGN PATENT DOCUMENTS

| | | |
|---|---|---|
| CN | 106951926 | 7/2017 |
| CN | 109508782 | 3/2019 |
| EP | 1988467 | 11/2008 |
| EP | 3396533 | 10/2018 |

(Continued)

OTHER PUBLICATIONS

Harris [online], "Inside pascal: NVIDIA's newest computing platform," NVIDIA Developer, Apr. 2016, retrieved on Nov. 25, 2019, URL <https://devblogs.nvidia.com/inside-pascal/>, 19 pages.

(Continued)

*Primary Examiner* — David R Vincent
(74) *Attorney, Agent, or Firm* — Fish & Richardson P.C.

(57) ABSTRACT

Methods, systems, and apparatus, including computer programs encoded on computer storage media, for virtualizing external memory as local to a machine learning accelerator. One ambient computing system comprises: an ambient machine learning engine; a low-power CPU; and an SRAM that is shared among at least the ambient machine learning engine and the low-power CPU; wherein the ambient machine learning engine comprises virtual address logic to translate from virtual addresses generated by the ambient machine learning engine to physical addresses within the SRAM.

20 Claims, 3 Drawing Sheets

(56) References Cited

FOREIGN PATENT DOCUMENTS

WO    WO 2015/183404    12/2015
WO    WO 2019/104228     5/2019

OTHER PUBLICATIONS

TW Office Action in Taiwan Application No. 108143271, dated Nov. 18, 2020, 13 pages (with English translation).
PCT International Search Report and Written Opinion in International Application No. PCT/US2019/063424, dated Apr. 1, 2020, 13 pages.

* cited by examiner

VIRTUALIZING EXTERNAL MEMORY AS LOCAL TO A MACHINE LEARNING ACCELERATOR

BACKGROUND

This specification relates to machine learning accelerators.

A machine learning ("ML") accelerator is a device or a component on a device, e.g., an integrated circuit having a specialized architecture designed for efficiently training machine learning models, executing machine learning models, or both training machine models and executing machine learning models.

An ML accelerator can be configured to perform inference passes through one or more machine learning models. Each inference pass uses inputs and learned parameter values of a machine learning model to generate one or more outputs predicted by the learned model. The ML accelerator can include one or more compute tiles. In general, a compute tile is a self-contained computational component configured to execute a set of computations independently. The tiles of an ML accelerator can be arranged in a network and programmed so that each tile of the ML accelerator is configured to perform operations of one portion of an inference pass through the machine learning model. For example, if the machine learning model is a neural network, each tile in the main ML engine 150 can be configured to compute the computations of one layer of the neural network.

ML accelerators require large amounts of memory to flexibly process different kinds of machine learning models. If an ML accelerator is a component in an ambient computing device, e.g., a cellphone, this requirement creates at least two problems:

First, allocating an upper range of memory to accommodate larger machine learning models is cost-prohibitive for most ambient computing devices using an ML accelerator. In addition, this approach also results in wasted memory dedicated to an ML accelerator that may often execute models requiring only a fraction of the allocated memory. Physical space is also wasted on a tightly-packed chip of an ambient computing device designed with portability in mind. Memory that is allocated to the ML accelerator is also not available to other processing components of the device.

Second, memory not in use for processing the machine learning model still draws power from the device, wasting energy. This problem is exacerbated on many ambient computing devices that are designed with low-power consumption in mind.

SUMMARY

This specification describes techniques for virtualizing external memory for use by an ML accelerator. The ML accelerator can include logic, e.g., implemented as an integrated circuit, for translating virtual memory addresses accessed by the ML accelerator while processing or training a machine learning model. The virtual memory addresses are translated to memory locations external to the ML accelerator, such as on RAM or on a system-level cache communicatively connected to the processing subsystem the ML accelerator is implemented in. Machine learning models with corresponding parameters can be streamed from outside the ML accelerator and accessed by the ML accelerator to simulate reading and writing to locations in memory that are local to the ML accelerator.

Particular embodiments of the subject matter described in this specification can be implemented so as to realize one or more of the following advantages. A small, low-power, ML accelerator can be implemented to process ambient signals received by an ambient computing device. The ML accelerator can be a single compute tile with access to larger shared caches of memory, without restricting access of the larger caches of memory only to the ML accelerator.

Virtual memory addresses can be assigned to stream machine learning models and corresponding parameters economically, because the ML accelerator can expand or shrink a virtual memory address range as dictated by memory requirements for a particular machine learning model. The ML accelerator can access a machine learning model and parameters stored on memory external to the ML accelerator without having to re-stream data, e.g., without having to re-stream often re-used model parameters in a convolutional neural network. Further, the ML accelerator can access the machine learning model and parameters stored externally without any special configuration. Put another way, from the perspective of the ML accelerator, the ML accelerator appears to be accessing memory local to the accelerator.

Similarly, the ML accelerator can also access data stored on a system-level cache, in devices having that memory configuration. The ability to allocate virtual memory addresses obviates the need for large amounts of dedicated memory to the ML accelerator, thereby reducing power consumption and the physical space the ML accelerator has to occupy in the ambient computing device.

Machine learning models compiled for executing on the ML accelerator can use the memory virtualization features disclosed without extensive configuration or customization. A compiler for a machine learning model can compile the model with minimal added instructions indicating that memory virtualization should be used.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for implementing memory virtualization as local to a machine learning ("ML") accelerator. Instead of dedicating large amounts of memory as local to the ML accelerator, the ML accelerator can access external memory through virtual memory addresses automatically assigned by virtual address logic local to the ML accelerator. The virtual address logic for the ML accelerator can also include logic to turn this memory virtualization feature on or off, depending on a configuration option added to a machine learning model during compilation of a program that implements inference passes over the model.

This and other configuration options can be included during the compilation of a machine learning model as compiled instructions that are executable by an ML accelerator, such as an ambient ML engine 134 or a main ML engine 150, discussed below.

Figure 1:
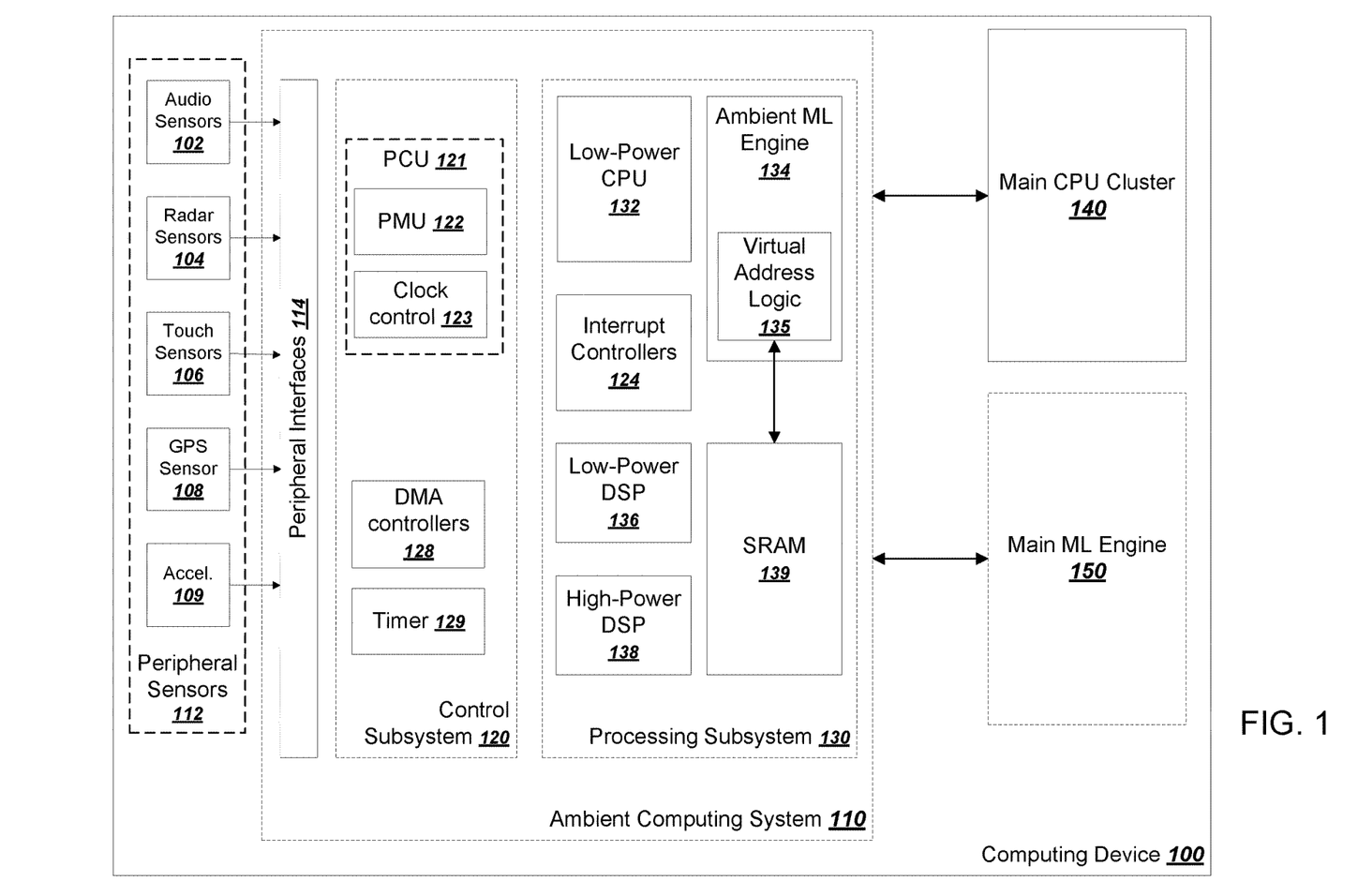
FIG. 1 is a diagram of an example computing device implementing an ML accelerator with virtual address logic.

FIG. 1 is a diagram of an example computing device 100 implementing an ML accelerator with virtual address logic. The device 100 can include an ambient computing system 110 implemented in any appropriate computing device, e.g., a smart phone, a smart watch, a fitness tracker, a personal digital assistant, an electronic tablet, a laptop, to name just a few examples. The ambient computing system 110 of the computing device 100 can be used so that the computing device 100 can remain in a low-power state yet continually monitor and respond to inputs from the environment by sequentially waking appropriate processing components of the system. While the ambient computing system 110 is discussed here with respect to FIG. 1, a general discussion of implementing low-power ambient computing systems can be found in International App. No. PCT/US2018/062329, which is incorporated in its entirety herein by reference.

The one or more components of the computing device 100 can be implemented on a system on a chip ("SOC") within the computing device. An SOC can be an integrated circuit that includes each component of the system on a single silicon substrate or on multiple interconnected dies, e.g., using silicon interposers, stacked dies, or interconnect bridges. Other components of the computing device, including a main CPU cluster 140, a main ML engine 150, or a processing subsystem 130, can be implemented on the same or on a separate die.

The computing device 100 may include components, including the sensors 112, one or more displays, a battery, and other components, that are separate from and independent of the SOC, and may for example be mounted on a common housing. The computing device 100 includes a control subsystem 120 for controlling the supply of power and sensor signals to components in the system. The device 100 includes a processing subsystem 130 for processing sensor signals and generating outputs.

The device 100 can include a number of peripheral sensors 112. The peripheral sensors 112 can include one or more audio sensors 102, one or more radar sensors 104, one or more touch sensors 106, a Global Positioning System ("GPS") sensor 108, and/or an accelerometer 110. The system can include additional, fewer, or alternative peripheral sensors. The peripheral sensors 112 can be devices configured to generate sensor signals in response to environmental inputs.

The ambient computing system 110 can include one or more peripheral interfaces 114. The peripheral interfaces 114 can be a component of the computing device 100 that is powered on even when the device is in its lowest power state. The peripheral interfaces 114 can include any appropriate peripheral interface for converting inputs received from the peripheral sensors 112 into sensor signals to be used by the ambient computing system 110.

Each of the peripheral interfaces 114 is configured to generate a respective interrupt upon detecting an environmental input. In general, each interrupt can identify a source of the sensor data, e.g., an identifier of a peripheral interface or sensor responsible for the interrupt. The interrupts are received and processed by one or more interrupt controllers 124. For example, upon receiving an interrupt, the interrupt controller 124 can wake a power control unit ("PCU") 121, which includes a power management unit ("PMU") 122 and a clock control unit 123. The PMU 122 can control which components of the device 100 receive power and how much power each component receives. The clock control unit 123 can control the frequency at which the components of the device 100 operate.

In this specification, whenever sensor signals are described as being inputs to other processing components, the inputs can be analog electrical signals generated by the sensors themselves, digital representations of the sensor signals, or processed digital representations of the sensor signals that represent one or more properties of the original signals.

Upon receiving an interrupt, the PCU 121 can determine based on the source of the interrupt which other components of the ambient computing system 110 should be activated in order to further process the sensor signals causing the interrupt. In order to provide processing support for such components, the PCU 121 can wake the static random access memory ("SRAM") 139 and the system communications fabric.

The system communications fabric is a communications subsystem that communicatively couples the internal components of the ambient computing system 110, their communications to external components, or some combination of these. The fabric can include any appropriate combination of communications hardware, e.g., buses or dedicated interconnect circuitry.

Although not depicted, the computing device 100 can also include one or more other components commonly found on such computing devices, e.g., a display, a modem, a graphics processing unit, a display processor, or a special-purpose image processor, to name just a few examples. These components can be powered down during the low-power states described below and activated if the system determines that the sensor signals match an application requiring their activation.

The device 100 also includes a main CPU cluster 140. The main CPU cluster 140 is a component of the computing device 100 that can include one or more general-purpose processors that are separate from the components in the processing subsystem 130. The processors of the main CPU cluster 140 generally have more computing power than any of the components in the processing subsystem 130, and therefore, the processors of the main CPU cluster 140 may also consume more power than any of the components in the processing subsystem 130.

The control subsystem 120 can also include a timer 129, which is an electronic timer that can detect system malfunctions and resolve those malfunctions. During normal operation, the control subsystem 120 can regularly reset the timer 129 to prevent the timer 129 from timing out. If, e.g., due to a hardware fault or a program error, the control subsystem 120 fails to reset a timer, the timer will elapse and generate a timeout signal. The timeout signal can be used to initiate one or more corrective actions. A corrective action can include placing the ambient computing system 110 in a safe state and restoring normal system operation.

The processing subsystem 130 includes an ambient machine learning engine 134. The ambient ML engine 134 is a special-purpose processing device that is configured to perform inference passes through one or more machine learning models.

The ambient ML engine 134 can include one or more multiply accumulate ("MAC") units and one or more sum registers for computing neural network activations or other neural network layer outputs, and a controller for controlling data exchange between sum registers and the MAC units. The ambient ML engine 134 can also include instruction memory, direct memory access paths, registers, and other processing components. In some implementations, the ambient ML engine 134 is a single machine learning compute tile that is configured to accelerate the computation of machine learning inference passes.

The ambient ML engine includes virtual address logic 135. The virtual address logic 135 can be a specialized circuit in the ambient ML engine 134 that can translate virtual addresses generated by the ambient ML engine into physical memory addresses in the SRAM 139, which is nonlocal memory for the ambient ML engine 134. In this specification, nonlocal memory for a component of the computing device 100, e.g., the ambient ML engine 134, refers to memory that is used by the component and one or more other components. In other words, nonlocal memory is not used exclusively by the component.

For example, the SRAM 139 can be a general purpose static random-access memory device that can be shared by multiple processing components of the processing subsystem 130, e.g., the low-power DSP 136, the high-power DSP 138, the low-power CPU 132, as well as the ambient ML engine 134. Therefore, the SRAM is nonlocal memory for the ambient ML engine 134. In contrast, the ambient ML engine 134 can also include local memory that is used exclusively by the ambient ML engine 134, and which may be integrated into the same silicon die as the rest of the ambient ML engine. For example, the ambient ML engine 134 can have local memory that includes one or more integrated registers. The integrated registers are local memory for the ambient ML engine 134 because data in the registers can only be read from or written to by only the ambient ML engine 134.

The SRAM 139 can store sensor signals, processor instructions and data, system outputs, and other data, e.g., neural network parameters of neural network models that are or will be implemented by the ambient ML engine 134.

In general, an SRAM is distinguishable from DRAM in that SRAM need not be periodically refreshed. As described in more detail below, the SRAM 139 is accessible to the processing components in the processing subsystem 130 directly or through direct memory access ("DMA") controllers 128. In some implementations, the SRAM 139 includes multiple banks of memory, each having substantially similar data capacities, e.g., 1, 10, or 100 MB each. In addition, each individual bank of memory can include multiple memory blocks that can be individually powered-down when entering a low-power state. By carefully sequencing the order that the blocks are powered-down amongst the multiple banks of memory, the SRAM memory address space can remain contiguous.

The virtual address logic 135 can translate virtual memory addresses that the ambient ML engine 134 generates. In some implementations, the virtual address logic 135 maintains a mapping between virtual pages and physical pages, e.g., using the most significant bits of the virtual addresses generated by the ambient ML engine 134.

The virtual address logic 135 can receive a request to read from or write to a virtual address generated by the compiled instructions executed by the ambient ML engine 134. The virtual address logic 135 can then map the virtual address to a physical address in the SRAM 139. In some implementations, the virtual address logic 135 maps a virtual page number to a physical page number and copies the least significant bits to generate the physical address.

Translating a virtual memory address into a physical memory address means that when an ML accelerator executes the compiled instructions for a machine learning model, every read or write instruction to data in a memory address in the compiled instructions results in data at a corresponding physical memory address location being read or written to, instead. In some implementations, the virtual address logic 135 is configured to issue read or write instructions to a corresponding physical memory address location in the SRAM 139, in response to the ambient ML engine 134 executing a read or write instruction to data at the virtual memory address location mapped to the corresponding physical memory address.

The virtual address logic 135 can map the virtual memory addresses to physical memory addresses for locations in memory that are nonlocal to the ambient ML engine 134. In some implementations, the processing subsystem 130 can overwrite existing data at the locations referenced by the mapped physical memory addresses. The virtual address logic 135 can be configured to perform this initialization step automatically, or in response to a configuration option indicated by a compiled program performing the inference pass on the machine learning model, e.g., as one or more instructions on the compiled program, to be executed on the ambient ML engine 134.

The ambient ML engine 134 can execute a compiled program having one or more instructions that performs an inference pass using a machine learning model, by accessing allocated nonlocal memory. From the point of view of the ambient ML engine 134, the data accessed at the virtual memory address locations is treated as local to the ambient ML engine 134, when in practice, the data is accessed from a shared source of memory, such as from the SRAM 139 or a system-level cache.

The device 100 can also optionally include a main ML engine 150. The main ML engine 150 is a special-purpose processing device that is configured to perform inference passes through one or more machine learning models, i.e., execute the machine learning model on the main ML engine 150. Each inference pass uses inputs and learned parameter values of a machine learning model to generate one or more outputs predicted by the learned model, as with the ambient ML engine 134. The main ML engine 150 can include one or more compute tiles, which can be arranged in a network and programmed so that each tile of the main ML engine 150 is configured to perform operations of one portion of an inference pass through the machine learning model. A suitable machine learning engine having multiple compute tiles is described in U.S. Pat. No. 9,710,265, which is incorporated in its entirety herein by reference.

When the device 100 includes both a main ML engine 150 and an ambient ML engine 134, the ambient ML engine 134 generally has fewer compute tiles and therefore has less processing power than the main ML engine 150 and consumes less power than the main ML engine 150. For example, the ambient ML engine 134 can be implemented as one or two compute tiles, whereas the main ML engine 150 can have 8 or more interconnected tiles.

Each compute tile may have a small amount of memory local to the tile. The amount of memory local to the compute tile is often insufficient for processing a machine learning model alone, which is why, as discussed above, the individual tiles can be configured into a network to share resources and to allocate the task of processing a machine learn model for a given input as a series of sub-tasks assigned to each compute tile.

Because the ambient ML engine 134 is generally implemented with relatively fewer compute tiles than the main ML engine 150, the one or two compute tiles available may not be sufficient for processing a machine learning model, even after optimizing a network configuration or partition the processing among the tiles. This can be because the compute tiles may lack the computational capacity to process the machine learning model, or because the compute tiles may not have sufficient memory. In some implementations, even the most rudimentary networking or partitioning is unavailable, because the ambient ML engine 134 is implemented as a single compute tile. Therefore, the virtual address logic 135 can perform memory virtualization as required by the ambient ML engine 134 to execute a machine learning model.

Although not shown in FIG. 1, the main ML engine 150 can also include virtual address logic for virtualizing non-local memory for the main ML engine 150. While the main ML engine 150 generally has more computational resources than the ambient ML engine 134, the main ML engine 150 may also require accessing memory not local to the main ML engine 150 to execute certain machine learning models. In those cases, virtual address logic can be implemented for the main ML engine 150 using the same techniques described for the virtual address logic 135 in the ambient ML engine 134. Instead of translating virtual memory addresses to physical memory addresses in SRAM as described with the ambient ML engine 134, virtual address logic for a main ML engine 150 can be configured to translate virtual memory addresses to physical memory addresses of a system-level cache ("SLC").

An SLC can be a device or a component of a device, e.g., the computing device 100, that can cache data retrieved from memory or data to be stored in memory for multiple different hardware devices in a system. In other words, different cache lines of the SLC can store data belonging to different hardware devices. In some implementations and as discussed below with respect to FIG. 2, virtual address logic can be implemented on the main ML engine 150 to translate virtual addresses corresponding to physical memory locations on the SLC.

Next, a discussion of an example operation of the ambient computing system 110 is presented. In this specification, the terms "wake" and "activate" will be used to mean supplying an increased amount of power to a particular processing component or other circuitry for electronics. The ambient computing system 110 may or may not have been supplying power to a processing component or other circuitry that is being awoken or activated. In other words, a component being awoken or activated may or may not have been completely powered down previously. Waking or activating a processing component can result in the processing component performing a boot process and causing instructions and data for the processing component to be loaded into random-access memory. Alternatively or in addition, waking or activating a processing component can include resuming from a previously suspended state.

When the PCU 121 wakes the SRAM 139, the PCU 121 can wake fewer than all of the blocks or all of the memory banks of the SRAM 139. The PCU 121 can instead wake only a number of blocks that is sufficient for the next component of the processing subsystem 130 to determine whether to further escalate powering up of components of the device 100.

The PCU 121 can also supply different power levels to different blocks of the SRAM 139. For example, in the monitoring power state, the PMU 122 can supply a lower, retention voltage to the entire SRAM 139 to reduce its power consumption. The PMU 122 can also supply the retention voltage to the SRAM 139 if no processing components need to access to the SRAM 139. In the processing power state, the PMU 122 can provide normal voltage to all or portions of the SRAM 139 and lowered or no voltage to other parts of the SRAM 139.

During the process of handling an interrupt, the ambient computing system 110 can also wake the one or more DMA controllers 128. The DMA controllers 128 can manage DMA pathways that allow higher data bandwidth for incoming sensor signals. For example, a DMA controller can be used to continuously stream audio data from a microphone into the SRAM 139 for access by processing components in the processing subsystem 130. Conversely, a DMA controller can also be used to continuously stream audio data stored in the SRAM 139 for output as sound through one or more speakers. The DMA controllers 128 can also be used to stream any appropriate sensor data into the SRAM 139, but using programmed IO may be computationally cheaper than activating a DMA controller for small quantities of data. Thus, the ambient computing system 110 can activate and use the DMA controllers 128 for relatively high-bandwidth sensor data, e.g., audio data and radar data, and can used programmed IO for other types of sensor data.

After preparing the fabric and the SRAM 139, the PCU 121 can then use the interrupts to determine which other component of the processing subsystem 130 to wake. For example, the PMU 122 can control whether power is provided to the low-power CPU 132, the low-power DSP 136, or other components of the processing subsystem 130 depending on which of one or more sensors generated an interrupt. In some implementations, the peripheral interfaces 114 and the components of the control subsystem 120 are the only components of the device 100 that are powered on in a monitoring power state, which is a power state in which the ambient computing system 110 is waiting to receive interrupts due to environmental inputs to the computing device.

The processing components of the processing subsystem 130 can include a low-power CPU 132, the ambient ML engine 134, a low-power DSP 136, and a high-power DSP 138. In some implementations, the processing subsystem has multiple instances of one or more of these components, e.g., multiple low-power DSPs or multiple high-power DSPs. For example, the processing subsystem 130 can have one high-power DSP that is dedicated to processing audio signals and a separate high-power DSP that is dedicated to processing radar signals. Alternatively or in addition, the processing subsystem 130 can have a high-power DSP that is dedicated to processing image data.

In the monitoring power state, the processing components in the processing subsystem 130 can be maintained in a retention mode. The PCU 121 can maintain a component in retention mode by reducing or eliminating power that is provided to the component. For example, in the retention mode, the PCU 121 can supply a processing component with just enough power to maintain register states, but not enough power to process data in the registers.

The low-power CPU 132 can be a general-purpose programmable processor that includes registers, control circuitry, and an arithmetic logic unit ("ALU"). In general, the low-power CPU 132 consumes less power than the main CPU cluster 140 of the computing device, and may contain fewer processing cores. In some implementations, the low-power CPU 132 is primarily a scalar processor that operates on single instructions and single data inputs. Based on the type of sensor signals the lower-power CPU 132 receives and based on the properties of those sensor signals, the low-power CPU 132 can determine that other components of the system should be activated, e.g., the communications fabric, the DMA controllers 128, some or all of the SRAM 139, or some combination of these. After activating these components, the low-power CPU 132 can optionally return to a non-operational state.

The low-power CPU 132 can provide the sensor signals, or a processed version thereof, to the ambient ML engine 134 for further interpretation. For example, if the low-power CPU 132 receives sensor signals corresponding to accelerometer input, the low-power CPU 132 can determine that the ambient ML engine 134 should further process the sensor signals. The ambient ML engine 134 can then further process the sensor signals.

One task of the ambient ML engine 134 is to use sensor signals to perform an inference pass over a machine learning model to generate an output that may trigger waking other processing components to further process the sensor signals. In other words, the ambient ML engine 134 can receive sensor signals, or a processed version thereof generated by the low-power CPU 132 or another processing component, and the ambient ML engine 134 can generate an output that represents which other processing components should further process the sensor signals.

The ambient ML engine 134 can also execute machine learning models for a variety of different tasks, including for: on-chip automatic speech recognition, text-to-speech generation, or gesture recognition by a user of the computing device. The ambient ML engine 134 can provide output from executing a machine learning model to the low-power CPU 132, or another processing component, for further action.

As discussed above, the virtual address logic 135 can be configured to execute memory virtualization when indicated to, e.g., from an instruction in the compiled instructions for a machine learning model. This option can be set during the compilation of the machine learning model by an appropriately configured compiler, e.g., as a default option or in response to input from a user prompt for a program implementing the compiler. The compiled instructions for executing the machine learning model on the ambient ML engine 134 remain the same whether memory virtualization is selected or not, but the compiler can additionally indicate, e.g., by one or more instructions, that the ambient ML engine 134 should execute the machine learning model using memory virtualization.

If memory virtualization is enabled, then the ambient ML engine 134 can stream in model parameters and other model configuration information from sources of memory not local to the ambient ML engine 134, using the mapped virtual memory addresses generated by the virtual address logic 135. For example, model parameters for the machine learning model can be stored in the SRAM 139 and referenced by one or more physical memory addresses.

The compiled instructions for the machine learning model can include instructions for loading, reading, and writing data in memory. The virtual address logic can be configured so that virtual memory addresses referenced in the compiled instructions of a compiled machine learning model are translated into corresponding physical memory addresses without altering the references in memory of the compiled instructions.

As an additional step, the processing subsystem 130 can initially load model parameters and other configuration information for the machine learning model into the SRAM 139, from another memory device. For example, the DMA controllers 129 can stream model parameters from DRAM into the SRAM 139. The DRAM can be local or external to the ambient computing system 110. Then, the virtual address logic 135 can map virtual memory addresses to the physical memory locations in the SRAM 139 where the model parameters were loaded. As part of streaming the parameters into the SRAM 139, the DMA controllers 129 can be configured to overwrite existing data stored in the SRAM 139, or alternatively stream the model parameters into available space in the SRAM 139. One or more instructions in the compiled instructions of the machine learning model can specify whether the DMA controllers 129 should overwrite existing data in the SRAM 139.

As discussed above, because the SRAM 139 can include multiple memory banks that may or may not be activated depending on the state of the computing device 100, some blocks or banks of memory in the SRAM 139 may not be available because there is already existing data, or because those particular blocks or banks of memory have not been activated.

While the DRAM can be part of the ambient computing system 110, the DRAM can also be external to the ambient computing system 110. In some implementations, the DRAM is external to the ambient computing system 110 but still on the same SOC. In some implementations, the DRAM is external to the SOC the ambient computing system is implemented on. The DMA controllers 128 can be configured to stream model parameters from the DRAM in either implementation.

If model parameters cannot be streamed into the SRAM 139, e.g., because the SRAM 129 is currently being used by other processing components of the ambient computing system 110, then the virtual address logic 135 can translate virtual memory addresses to physical memory addresses where the model parameters are stored, directly. In some implementations, the virtual address logic can be configured to translate physical memory addresses on the DRAM where model parameters are stored, instead of first streaming the model parameters into the SRAM 139 using the DMA controllers 128.

Configuration information for the machine learning model can also include one or more instructions specified at compile-time, indicating how much local memory the ambient ML engine 134 should have access to. For example, if the compiler compiled a machine learning model into a set of instructions under the assumption that the ML engine executing the model would have a certain size of memory allocated to it, the virtual address logic can be configured to provide that size of memory as virtual memory addresses mapped to physical memory addresses in the SRAM 139. Alternatively, at compile-time, a program executing the compiler can set a memory size in response to a user prompt or default condition.

The ambient ML engine 134 can reference virtual memory addresses as described above in combination with accessing data stored local to the ambient ML engine 134. In some implementations where the ambient ML engine 134 includes one or more registers, the ambient ML engine 134 can access data not local to the ambient ML engine 134 through a virtual memory address, and then load the accessed data to the registers of the ambient ML engine 134. This way, data most likely to be accessed repeatedly by the ambient ML engine 134, such as parameters or a subset of common parameters for a convolution in a convolution neural network model, can be stored on the fastest memory available to the ambient ML engine 134, which is often local registers.

The output generated by the ambient ML engine 134 can explicitly specify a combination of processing component IDs or an identifier of an enumerated power state or the output can be a representation of a power state that is interpreted by a low-power processing component, e.g., the low-power CPU or the low-power DSP, in order to identify other higher-power processing components that should process the sensor signals. As part of this process, the low-power processing component can explicitly or implicitly determine whether any other processing is required. For example, the low-power processing component can determine, based on the output of the ambient ML engine 134, that no further processing is required and that the ambient computing system 110 can transition back to the monitoring power state.

In the lowest-level monitoring power state, the PCU 121 can keep the ambient ML engine 134 in a low-power state or powered down completely. In the processing power state, the PCU 121 may or may not provide power to the ambient ML engine 134 depending on what sensor signals are available at the peripheral interfaces 114 and how the low-power CPU 132 or the low-power DSP 136 interpret the signals. In some implementations, the low-power DSP 136 or the low-power CPU 132 can interpret the signals to instruct the PCU 121 to provide power for an additional, intermediate power state, in which the ambient ML engine 134 is also powered on for the inference pass, but no other high-power processing components are yet powered on.

The low-power DSP 136 and the high-power DSP 138 are special-purpose processors configured for efficient decoding and processing of highly-vectorized signals. The processing subsystem 130 can include a variety of DSPs that are designed for different purposes. For example, the processing subsystem 130 can include a DSP that is configured to process radar signals or a DSP that is configured to process audio signals.

As described above, the low-power DSP 136 can perform the initial interpretation of sensor signals from the control subsystem 120. The low-power DSP 136 can also perform other signal processing tasks as well. In general, high-power DSPs consume higher levels of power than low-power DSPs because they have more active registers, they access and process more data in parallel, because they rely more heavily on memory operations, or some combination of these.

Figure 2:
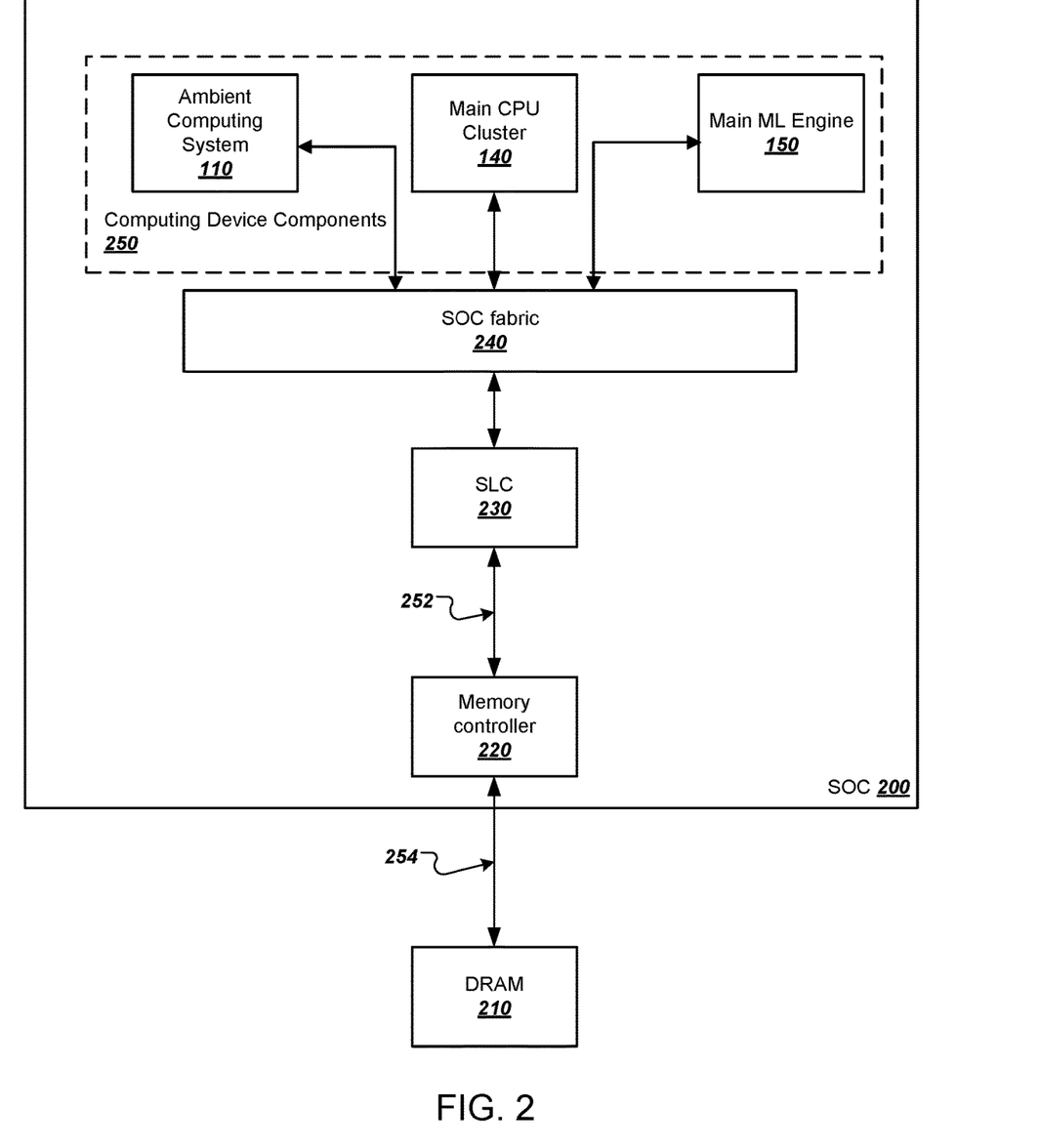
FIG. 2 is a diagram of an example system on a chip implementing an SLC communicatively connected to the computing device of FIG. 1.

FIG. 2 is a diagram of an example system on a chip 200 implementing an SLC communicatively connected to the computing device 100 of FIG. 1. The SOC 200, for example, can be installed on or integrated into the computing device 100, or be a separate device or component of a separate device.

Computing device components 250 can communicate with an SLC 230 through an SOC fabric 240. The computing device components 250 can be any components on the computing device 100 that are configured to be able to communicate with the SLC 230, and can include the main ML engine 150, the main CPU cluster 140, and the ambient computing system 110.

The SOC fabric 240 is a communications subsystem of the SOC 200 and can include communications pathways that allow the computing device components 250 to communicate with one another as well as to make requests to read and write data on the SLC 230. The SLC 230 has dedicated cache memory, which can be implemented using dedicated registers or high-speed RAM. The SOC fabric 240 can include any appropriate combination of communications hardware, e.g., buses or dedicated interconnect circuitry.

The system 100 also includes communications pathways 252 that allow communication between the SLC and a memory controller 220 as well as inter-chip communications pathways 254 that allow communication between the memory controller 220 and DRAM 210 that is not local to the SOC 200. The memory controller 220 can handle requests to read and write memory to and from the SLC 230 and the DRAM 210. Although only the DRAM 210 is shown in FIG. 2, the memory controller 220 can communicate with other memory devices not shown, such as any volatile or non-volatile memory device, e.g., a hard drive or a solid state drive.

The SLC 230 can cache read requests, write requests, or both from the computing device components 250. The SLC 230 can cache read requests from client devices by responding to the request with data stored in the cache data rather than fetching the data from the DRAM 210. Similarly, the SLCs can cache write requests from client devices by writing the new data in the cache rather than writing the new data in the DRAM. The SLC 230 can then perform a write-back at a later time to store the updated data in the DRAM 210.

As discussed above, the main ML engine 150 can include virtual address logic for translating virtual memory addresses to mapped physical memory addresses to memory not local to the main ML engine 150. Whereas the virtual address logic 135 mapped physical memory addresses to the shared SRAM 139 of the processing subsystem 130, virtual address logic for the main ML engine 150 can, in some implementations, map virtual memory addresses to physical memory addresses located in the SLC 230.

When memory virtualization is enabled for a machine learning model executing on the main ML engine 150, the virtual address logic can be configured to communicate with the SLC 230 through the SOC fabric 240 to translate virtual memory addresses to physical memory addresses in the DRAM 210. As an initialization step, the memory controller 220 can stream in model parameters that are being streamed into the SLC 240 for the first time from the DRAM 210 or other memory device not local to the SOC 200.

Figure 3:
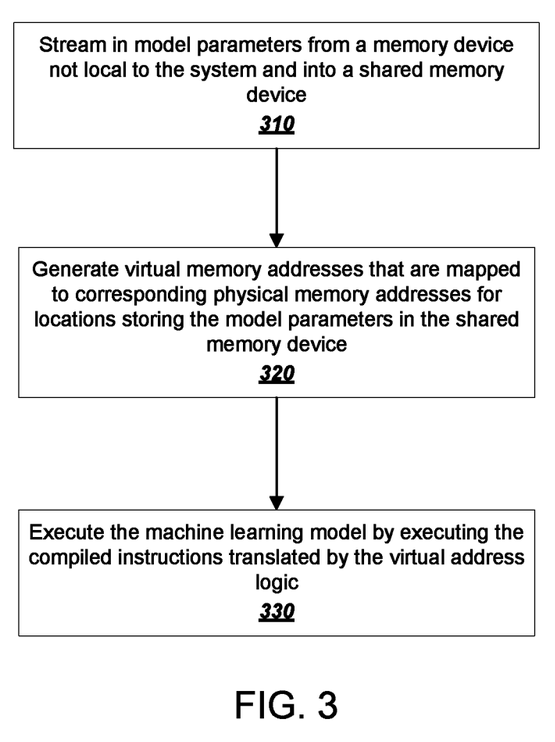
FIG. 3 is a flowchart for an example process for executing a machine learning model on an ML accelerator using memory virtualization.

FIG. 3 is a flowchart for an example process for executing a machine learning model on an ML accelerator using memory virtualization. For convenience, the process in FIG. 3 will be described as being performed by a system of one or more computers located in one or more locations. For example, an ambient computing system, e.g., the ambient computing system 110 of FIG. 1, appropriately programmed in accordance with this specification, can perform the process in FIG. 3. Additional detail for implementing a system that can perform the process in FIG. 3 can be found in the description of FIG. 1 and FIG. 2, above.

The system streams in model parameters from a memory device not local to the system and into a shared memory device (310). As discussed above with reference to FIG. 1 and FIG. 2, model parameters for a machine learning model executing on an ML accelerator may be stored in memory not local to the system, such as on DRAM. The system, for example through a DMA controller, can stream in the model parameters and any configuration options for executing the machine learning model. The memory device can be, for example, shared SRAM. In some implementations, as discussed earlier, the system can overwrite existing data in the shared memory device. The ML accelerator can be, as discussed above, the ambient ML engine or the main ML engine of the system. If the ML accelerator is the main ML engine of the system, then the shared memory device can be a system-level cache.

The system through the virtual address logic on the ML accelerator generates virtual memory addresses that are mapped to corresponding physical memory addresses for locations storing the model parameters in the shared memory device (320). As discussed above with reference to FIG. 1, the virtual address logic can generate the virtual memory addresses from the memory addresses referenced in read or write instructions in the compiled instructions for the machine learning model. The virtual memory logic can also be configured to generate mappings between the virtual and physical memory addresses and store the mappings in memory local to the ML accelerator, such as in registers.

The system executes a compiled program to perform an inference pass on the machine learning model by executing the compiled instructions translated by the virtual address logic (300). As discussed above with reference to FIG. 1, the system executes a compiled program that performs an inference pass using the machine learning model, specifically using the model parameters stored in the shared memory device. As also discussed above, translating between virtual and physical memory addresses means issuing appropriate read or write instructions to a physical memory address location matching the read or write instructions in the compiled instructions to a location for a virtual memory address mapped to the physical memory address.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a hardware-implemented or software implemented input/output system that provides an output that is different from the input. An engine can be implemented in dedicated digital circuitry or as computer-readable instructions to be executed by a computing device. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a host device having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

In addition to the embodiments described above, the following embodiments are also innovative:

Embodiment 1 is an ambient computing system comprising: an ambient machine learning engine; a low-power CPU; and an SRAM that is shared among at least the ambient machine learning engine and the low-power CPU; wherein the ambient machine learning engine comprises virtual address logic to translate from virtual addresses generated by the ambient machine learning engine to physical addresses within the SRAM.

Embodiment 2 is the ambient computing system of embodiment 1, wherein the ambient computing system is configured to stream, into the SRAM, parameters for a machine learning model from a DRAM that is separate from the ambient computing system.

Embodiment 3 is the ambient computing system of any one of embodiments 1 through 2, wherein the ambient computing system is integrated into a system-on-a-chip, and wherein the DRAM is separate from the system-on-a-chip.

Embodiment 4 is the ambient computing system of any one of embodiments 1 through 3, wherein streaming the parameters of the machine learning model from the DRAM overwrites instructions or data in the SRAM previously.

Embodiment 5 is the ambient computing system of any one of embodiments 1 through 4, wherein the ambient machine learning engine is configured to perform an inference pass over a machine learning model by reading, from the SRAM, parameters of the machine learning model.

Embodiment 6 is the ambient computing system of any one of embodiments 1 through 5, wherein reading, from the SRAM, the parameters of the machine learning model comprises executing, by the ambient machine learning engine, read instructions that have virtual addresses that do not correspond to addresses in the SRAM.

Embodiment 7 is the ambient computing system of any one of embodiments 1 through 6, wherein the ambient machine learning engine is configured to provide the virtual addresses of the read instructions to the ambient machine learning engine in order to generate physical addresses that represent locations in the SRAM.

Embodiment 8 is the ambient computing system of any one of embodiments 1 through 7, wherein the ambient machine learning engine is configured to execute instructions generated from an input program by a compiler program that takes as an input argument a size of local memory that is available to the ambient machine learning engine, and wherein the instructions were generated by providing to the compiler program a size of the SRAM as local memory that is available.

Embodiment 9 is the ambient computing system of any one of embodiments 1 through 8, wherein the ambient computing system is configured to perform operations comprising: receiving an interrupt representing receipt of one or more sensor signals to be processed; activating a first processing component of the one or more other processing components, including streaming instructions to be executed by the first processing component into the SRAM; processing, by the first processing component, the one or more sensor signals using the instructions in the SRAM to determine that the ambient machine learning engine should further process the one or more sensor signals; activating the ambient machine learning engine including streaming parameters to be used by the ambient machine learning engine into the SRAM; and performing, by the ambient machine learning engine, an inference pass of a machine learning model using the parameters stored in the SRAM.

Embodiment 10 is the ambient computing system of any one of embodiments 1 through 9, wherein streaming the parameters to be used by the ambient machine learning engine into the SRAM overwrites the instructions executed by the first processing component that were stored in the SRAM.

Embodiment 11 is the ambient computing system of any one of embodiments 1 through 10, wherein the SRAM is further shared with a direct memory access controller, one or more other machine learning engines, or one or more other processors.

Embodiment 12 is the ambient computing system of any one of embodiments 1 through 11, wherein the one or more other machine learning engines comprise a main machine learning engine.

Embodiment 13 is a method for virtualizing memory on a ambient computing system, the system comprising: an ambient machine learning engine comprising virtual address logic; a low-power CPU; and an SRAM that is shared among at least the ambient machine learning engine and the low-power CPU, wherein the method comprises: receiving, by the virtual address logic of the ambient machine learning engine, virtual addresses generated by the ambient machine learning engine; and translating, by the virtual address logic on the ambient machine learning engine, virtual addresses generated by the ambient machine learning engine to physical addresses within the SRAM.

Embodiment 14 is the method for virtualizing memory of embodiment 13, wherein the ambient computing system is any one of embodiments 1 through 12.

Embodiment 15 is one or more computer-readable storage media encoded with instructions to be executed by an ambient machine learning engine of an ambient computing system, the ambient computing system further comprising a low-power CPU, and an SRAM that is shared among at least the ambient machine learning engine and the low-power CPU, wherein one or more of the instructions comprise virtual addresses that correspond to physical addresses in the SRAM shared among the ambient machine learning engine and the low-power CPU.

Embodiment 16 is the one or more computer-readable storage media of embodiment 15, wherein the ambient computing system is any one of embodiments 1 through 12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. An ambient computing system comprising:
   an ambient machine learning engine;
   a low-power processing component; and
   an SRAM that is shared among at least the ambient machine learning engine and the low-power processing component;
   wherein the ambient machine learning engine comprises virtual address logic configured to translate from virtual addresses generated by the ambient machine learning engine to physical addresses within the SRAM, and wherein the ambient computing system is configured to perform operations comprising:
   receiving an interrupt representing receipt of one or more sensor signals to be processed;
   in response, streaming parameters to be used by the ambient machine learning engine into the SRAM; and
   performing, by the ambient machine learning engine, an inference pass of a machine learning model including using the virtual address logic to access the parameters that were streamed into the SRAM in response to receiving the interrupt.

2. The ambient computing system of claim 1, wherein the ambient computing system is configured to stream, into the SRAM, parameters for the machine learning model from a DRAM that is separate from the ambient computing system.

3. The ambient computing system of claim 2, wherein the ambient computing system is integrated into a system-on-a-chip, and wherein the DRAM is separate from the system-on-a-chip.

4. The ambient computing system of claim 2, wherein streaming the parameters of the machine learning model from the DRAM overwrites instructions or data in the SRAM previously.

5. The ambient computing system of claim 1, wherein performing the inference pass comprises reading, from the SRAM, parameters of the machine learning model.

6. The ambient computing system of claim 5, wherein reading, from the SRAM, the parameters of the machine learning model comprises executing, by the ambient machine learning engine, read instructions that have virtual addresses that do not correspond to addresses in the SRAM.

7. The ambient computing system of claim 6, wherein the ambient machine learning engine is configured to provide the virtual addresses of the read instructions to the ambient machine learning engine in order to generate physical addresses that represent locations in the SRAM.

8. The ambient computing system of claim 1, wherein the ambient machine learning engine is configured to execute instructions generated from an input program by a compiler program that takes as an input argument a size of local memory that is available to the ambient machine learning engine, and
   wherein the instructions were generated by providing to the compiler program a size of the SRAM as local memory that is available.

9. The ambient computing system of claim 1, the operations comprising:
   activating the low-power processing component including streaming instructions to be executed by the low-power processing component into the SRAM;
   processing, by the low-power processing component, the one or more sensor signals using the instructions in the SRAM to determine that the ambient machine learning engine should further process the one or more sensor signals;
   activating the ambient machine learning engine including streaming the parameters to be used by the ambient machine learning engine into the SRAM; and
   performing, by the ambient machine learning engine, an inference pass of a machine learning model using the parameters stored in the SRAM.

10. The ambient computing system of claim 9, wherein streaming the parameters to be used by the ambient machine learning engine into the SRAM overwrites the instructions executed by the low-power processing component that were stored in the SRAM.

11. The ambient computing system of claim 1, wherein the SRAM is further shared with a direct memory access controller, one or more other machine learning engines, or one or more other processors.

12. The ambient computing system of claim 11, wherein the one or more other machine learning engines comprise a main machine learning engine.

13. A method for virtualizing memory on a ambient computing system, the system comprising:
   an ambient machine learning engine comprising virtual address logic;
   a low-power processing component; and an SRAM that is shared among at least the ambient machine learning engine and the low-power processing component, wherein the method comprises:
receiving, by the virtual address logic of the ambient machine learning engine, virtual addresses generated by the ambient machine learning engine;
translating, by the virtual address logic on the ambient machine learning engine, virtual addresses generated by the ambient machine learning engine to physical addresses within the SRAM;
receiving an interrupt representing receipt of one or more sensor signals to be processed;
in response, streaming parameters to be used by the ambient machine learning engine into the SRAM; and
performing, by the ambient machine learning engine, an inference pass of a machine learning model including using the virtual address logic to access the parameters that were streamed into the SRAM in response to receiving the interrupt.

14. The method of claim 13, wherein the ambient computing system is configured to stream, into the SRAM, parameters for the machine learning model from a DRAM that is separate from the ambient computing system.

15. The method of claim 14, wherein the ambient computing system is integrated into a system-on-a-chip, and wherein the DRAM is separate from the system-on-a-chip.

16. The method of claim 14, wherein streaming the parameters of the machine learning model from the DRAM overwrites instructions or data in the SRAM previously used by the low-power processing component.

17. The method of claim 13, wherein performing the inference pass comprises reading, from the SRAM, parameters of the machine learning model.

18. The method of claim 17, wherein reading, from the SRAM, the parameters of the machine learning model comprises executing, by the ambient machine learning engine, read instructions that have virtual addresses that do not correspond to addresses in the SRAM.

19. The method of claim 13, wherein the SRAM is further shared with a direct memory access controller, one or more other machine learning engines, or one or more other processors.

20. One or more computer-readable storage media encoded with instructions to be executed by an ambient machine learning engine of an ambient computing system, the ambient computing system further comprising a low-power processing component, and an SRAM that is shared among at least the ambient machine learning engine and the low-power processing component, wherein one or more of the instructions comprise virtual addresses that correspond to physical addresses in the SRAM shared among the ambient machine learning engine and the low-power processing component, and wherein the ambient computing system is configured to perform operations comprising:
receiving an interrupt representing receipt of one or more sensor signals to be processed;
in response, streaming parameters to be used by the ambient machine learning engine into the SRAM; and
performing, by the ambient machine learning engine, an inference pass of a machine learning model including using the virtual address logic to access the parameters that were streamed into the SRAM in response to receiving the interrupt.

* * * * *